March 22, 1938.  F. C. STEWART  2,111,906
VENTILATOR COWL
Filed Dec. 22, 1936
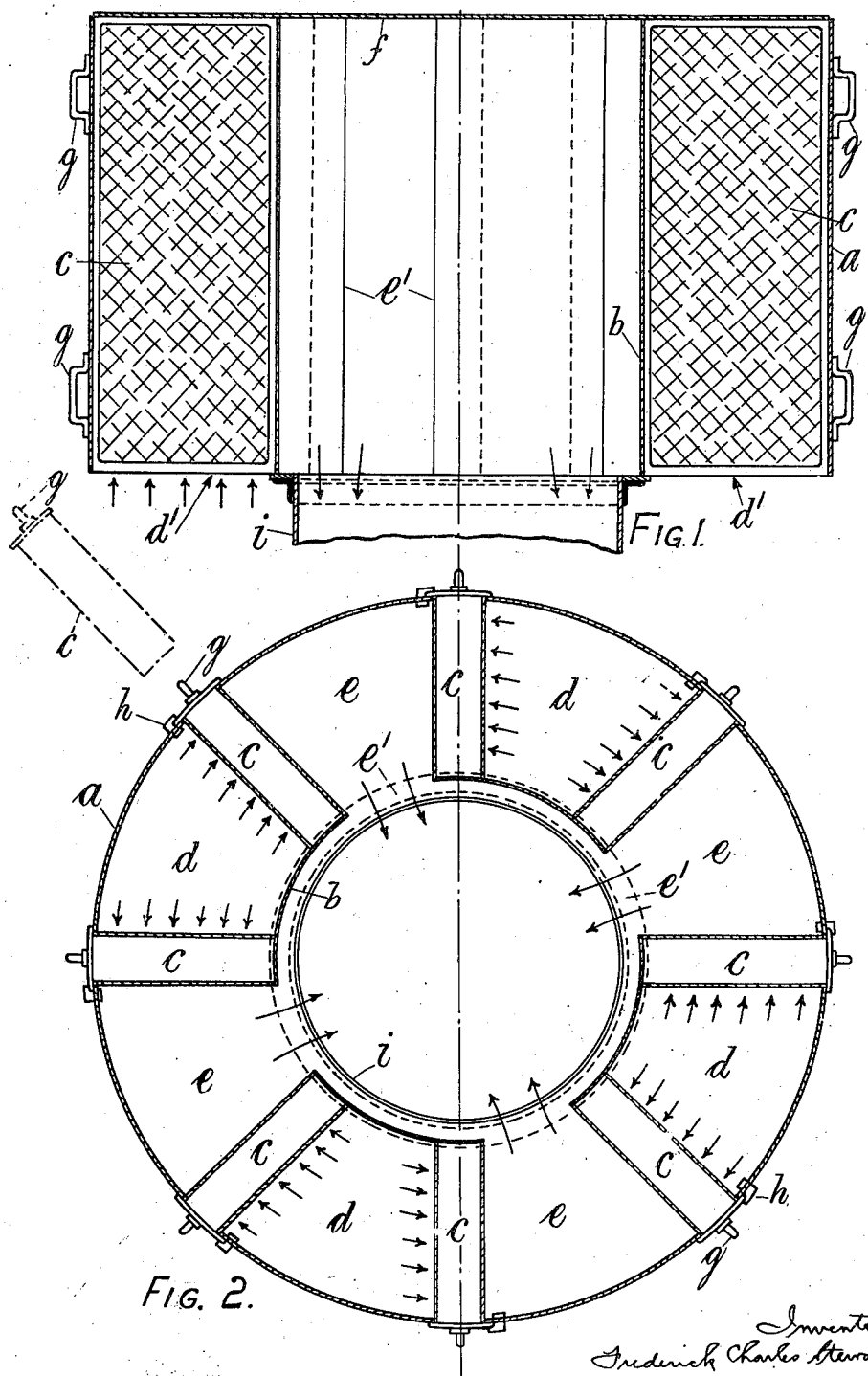

Patented Mar. 22, 1938

2,111,906

UNITED STATES PATENT OFFICE 2,111,906

VENTILATOR COWL

Frederick Charles Stewart, Glasgow, Scotland

Application December 22, 1936, Serial No. 117,132
In Great Britain December 23, 1935

1 Claim. (Cl. 183—44)

The subject of this invention is an improved cowl for ships' and like ventilators.

A ventilator cowl according to the invention includes an outer tubular shell and an inner tubular shell spaced from the outer shell and defining therewith a space accommodating filter cells interposed between atmospheric inlets and the interior of the inner shell, which latter is adapted for connection to the inlet end of a ventilator tube or the like.

A practical construction includes coaxial outer and inner shells formed as bodies of revolution and defining between them an annular space partitioned internally by radially disposed filter cells alternating with segmental inlet and outlet spaces of which the inlet spaces are open to atmosphere at at least one end of the shell assembly and of which the outlet spaces communicate with the interior of the inner shell by way of apertures or cut-aways in the circumferential wall of the inner shell.

The invention will now be more particularly described with reference to the accompanying drawing in which Fig. 1 is a vertical section of a cowl constructed according to the invention and shown applied to a vertical ventilator tube, only the upper end of which is shown. Fig. 2 is a transverse sectional plan of the cowl shown in Fig. 1.

In the drawing, $a$ is a cylindrical outer shell and $b$ a cylindrical inner shell coaxial with the shell $a$. The shells $a$ and $b$ enclose between them an annular space partitioned internally by radially disposed filter cells $c$ alternating with segmental inlet spaces $d$ and outlet spaces $e$. The inlet spaces $d$ are each open to atmosphere at the bottom end $d^1$. The outlet spaces $e$ each communicate with the interior of the inner shell $b$ by way of apertures or cut-aways $e^1$ in the circumferential wall of the said inner shell. The upper end of the shell assembly is entirely closed by a plate $f$. The lower end of each outlet space $e$ is also closed. The filter cells $c$ are insertable into and removable from operative position through cut-aways in the circumferential wall of the outer shell $a$, handles $g$ being provided on each cell to facilitate insertion and removal. A filter cell $c$ removed from the cowl is indicated in dotted lines in Fig. 2. Latches $h$ are provided on the outer shell $a$ in convenient position for retaining the cells $c$ in position in the cowl. The filtering medium may be constituted by metallic or other wool or shingle or fabric which, when coated with oil or other liquid, readily traps solid particles entrained with the air passing through the filters.

Fig. 1 shows the cowl fitted to the upper end of a vertical ventilator tube $i$, to which it is secured in appropriate manner.

Air drawn through the openings $e^1$ into the inlet spaces $e$ passes through the filter cells $c$ and the filtered air is received into the outlet spaces $d$, whence it passes, by way of the apertures $d^1$, into the interior of the shell $b$ and downwardly through the ventilator pipe $i$.

If desirable, the inner cylindrical shell $b$ may be replaced by a conical shell and the filter cells $c$ shaped to suit.

It will be understood that polygonal or otherwise shaped shells may be adopted without departure from the scope of the invention.

I claim:

In combination with a ventilating tube open at its upper end, an apertured inner cylindrical shell surmounting said tube and coaxial with said tube, said inner shell open at its lower end and in communication with said tube, an outer cylindrical shell coaxial with and spaced radially from said inner shell, the bottom of said outer shell being formed with permanently open air inlet openings, said shells embracing between them an annular space, a closure for the upper ends of said inner and outer shells, and filter cells radially disposed within said annular space, said filter cells being insertable and withdrawable radially, said filter cells interposed between segmental air inlet spaces and segmental air outlet spaces, said inlet spaces communicating at all times with said openings, and said outlet spaces communicating at all times with the interior of said inner shell by way of the apertures in said inner shell.

FRED. C. STEWART.